S. E. PARRISH.
MEASURING APPLIANCE.
APPLICATION FILED FEB. 24, 1920.

1,367,278.

Patented Feb. 1, 1921.

Inventor
Stephen E. Parrish

UNITED STATES PATENT OFFICE.

STEPHEN E. PARRISH, OF GRAND RAPIDS, MICHIGAN.

MEASURING APPLIANCE.

1,367,278.        Specification of Letters Patent.        Patented Feb. 1, 1921.

Application filed February 24, 1920. Serial No. 360,744.

*To all whom it may concern:*

Be it known that I, STEPHEN E. PARRISH, a citizen of the United States of America, residing at Grand Rapids, in the county of Kent and State of Michigan, have invented certain new and useful Improvements in Measuring Appliances; and I do hereby declare the following to be a full, clear, and exact description of the invention, such as will enable others skilled in the art to which it appertains to make and use the same.

This invention relates to a measuring or computing device being particularly directed to a device by means of which, after the number of folds of cloth or like material in a bolt have been counted, the number of yards in said bolt may be very quickly determined with approximate accuracy, this device being of use in inventorying the stock on hand in a store which handles goods of this character. It is a primary object and purpose of the present invention to make a device of this character which will carry a chart the same rolling up and occupying but small space when not in use but which when unrolled to a width equal to the width of the bolt, carries on its face the approximate number of yards on the bolt directly in line with figures which refer to the number of folds or turns of the material around the core of the bolt.

For an understanding of the invention and the construction embodying the same, reference may be had to the following description taken in connection with the accompanying drawing, in which.

Like reference characters refer to like parts in the different views of the drawing.

Figure 1:
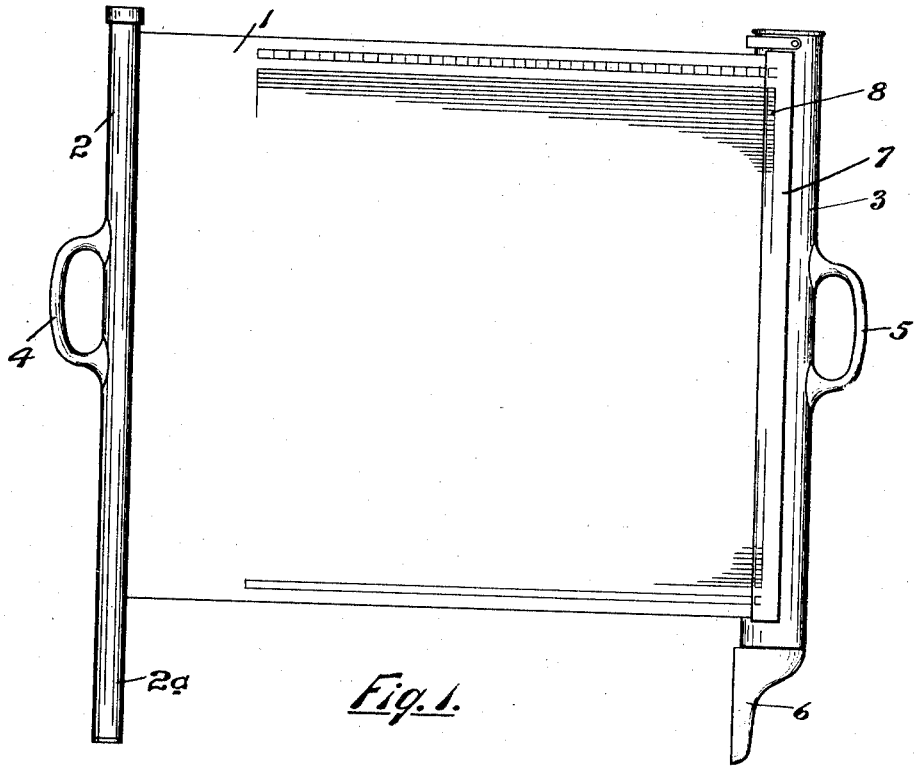
Figure 1 is an elevation of the device with the chart partially drawn out.
Figure 2:
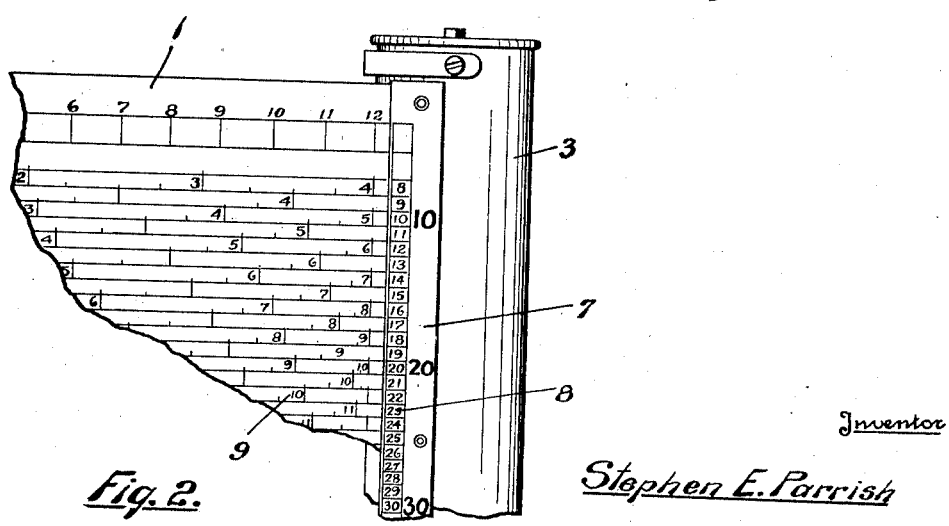
Fig. 2 is a fragmentary enlarged elevation of a portion of the device illustrating the relation of the chart numbers to the fold numbers carried on the case into which the chart is received when not in use.

The chart 1 may be made of any suitable durable material, being attached at one end to a rod 2 and at the opposite end to a spring operating roller within a case 3. The construction of this roller is not particularly material to the present invention as any well known type of spring roller which will normally tend to roll the chart within the case, may be used. Handles 4 and 5 are connected to the rod 2 and the case 3 so that the same may be grasped and the chart withdrawn on exertion of force. The rod 2 has an extension $2^a$ extending beyond one edge of the chart and the case 3 likewise has a projecting finger 6 attached at one end and extending beyond the same edge of the chart. Alongside the slot in the case through which the chart passes a flat bar 7 is attached and the same divided lengthwise into a plurality of spaces which carry numbers, indicated at 8, and which in the use of the chart, refer to the different numbers of folds or turns of cloth which may be around the central core in a bolt.

The first operation performed in determining the length of cloth or other material in a bolt is to determine the number of folds or turns around the core. This may be done by counting or by use of the instrument shown in my prior application for patent, Serial No. 261,410, filed March 16, 1918. The handles 4 and 5 are then grasped and the chart drawn from the case so that the distance between the extension $2^a$ and the finger 6 is greater than the width of the bolt. The bolt is placed between said extension and finger and the chart then allowed to enter the case until the extension $2^a$ and finger 6 bear against opposite edges of the bolt, then referring to the number of folds or turns, which has already been determined, on the scale 8. The number of yards in the bolt appears immediately to the left of said figure. These figures on the chart, indicated at 9, have been empirically determined. It is well known that given the number of turns of cloth or like material on a core in a bolt and the width of the bolt the number of yards in the bolt can be found by means of charts such as have been comprised and used for many years.

With this invention a collection in one chart of all of the necessary elements for determining the number of yards on a bolt appears and the chart has figures bearing the proper relation to the number of turns of cloth or like material on the core and the width of the bolt which is determined by the engagement of the caliper extension $2^a$ and finger 6.

This device is very convenient to handle, occupies little space when not used as the chart is immediately retracted into the case when it is not used. The necessity of using calipers and a separate chart is eliminated, both being combined in a single device; also there is no necessity of determining the distance between the two parts of the calipers and then referring to a chart which has the number of yards in a bolt with reference to such width and the number of folds of cloth which are around the core. The device is very simple, convenient for use and has proven practical and serviceable in use.

I claim:

1. In a device of the character described, a casing into which a chart is adapted to roll, a rod attached to the outer end of the chart and having a portion extending beyond one edge of the chart, a finger extending from one end of the casing beyond the same edge of the chart, handles on the casing and rod, there being a scale of figures located lengthwise of the casing in proximity to the chart, said chart carrying a series of figures registering with the figures of the scale referring to the number of units of measurement in a bolt of cloth or like material with relation to the number of turns or folds of cloth around the core of the bolt, indicated on the scale, the reading on the chart with reference to any number of folds being determined by insertion of the width of the bolt between said finger and extension to the rod, substantially as and for the purposes described.

2. In combination, a casing, a chart adapted to be received within the casing, a rod attached to the outer end of the chart, said rod and casing extending beyond one edge of the chart, means on the rod and casing for withdrawing the chart from the casing, there being a scale located lengthwise of the casing in proximity to where the chart leaves the casing, said chart being provided with a series of figures bearing relation to the scale and the distance between the extended ends of the casing and rod, substantially as described.

3. In combination, a chart, contact parts associated with the chart between which the width of a bolt of cloth may be placed, means for rolling the chart, means for unrolling the chart, said rolling of the chart bringing the contact parts toward each other, there being a scale associated with the chart carrying a series of figures relating to the number of thicknesses of cloth or the like in a bolt, and said chart carrying figures registering with the figures of the scale and bearing relation to the same and the distance between the calipers to determine the number of units of measurement of material in the bolt, substantially as and for the purposes described.

In testimony whereof I affix my signature.

STEPHEN E. PARRISH.